C. H. KUGLER.
CUTTING APPARATUS FOR HARVESTING MACHINES.
APPLICATION FILED NOV. 15, 1912.
1,078,101. Patented Nov. 11, 1913.
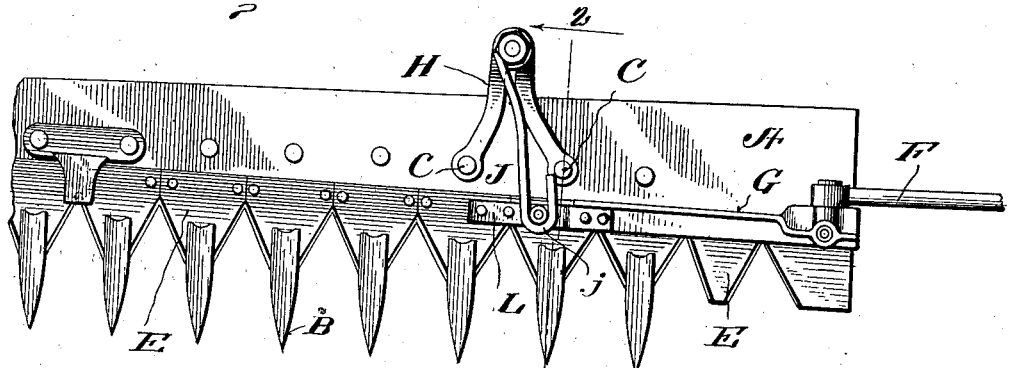
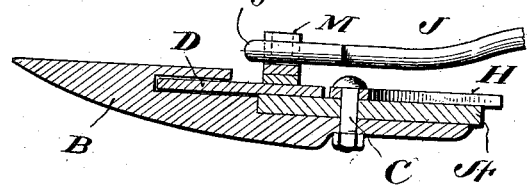
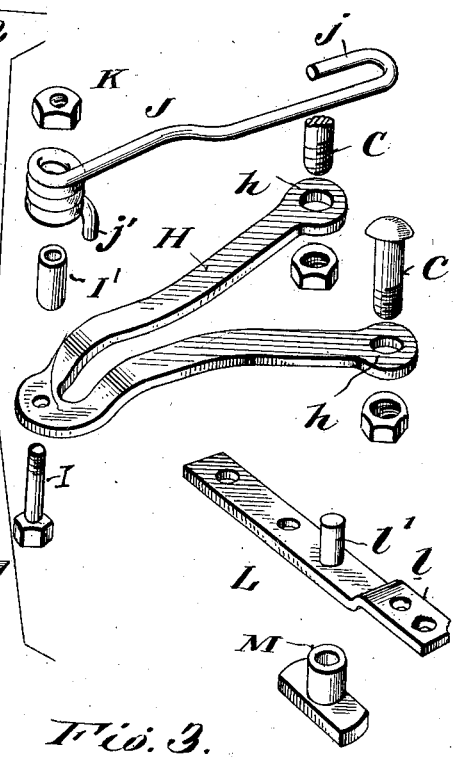
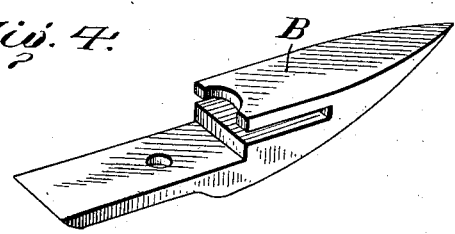
Witnesses
Inventor
Charles H Kugler
by his Attorneys

UNITED STATES PATENT OFFICE.

CHARLES H. KUGLER, OF COZAD, NEBRASKA.

CUTTING APPARATUS FOR HARVESTING-MACHINES.

1,078,101. Specification of Letters Patent. Patented Nov. 11, 1913.

Application filed November 15, 1912. Serial No. 731,589.

*To all whom it may concern:*

Be it known that I, CHARLES H. KUGLER, a citizen of the United States, residing at Cozad, in the county of Dawson and State of Nebraska, have invented certain new and useful Improvements in Cutting Apparatus for Harvesting-Machines, of which the following is a specification.

My invention relates to the cutting apparatus of mowers, binders and other harvesting machines, and the object of my invention is to provide improved means for giving to the sickle-bar a steady movement during its reciprocations.

In carrying out my invention I provide a bracket, of improved construction, which is adapted to be secured to the finger bar by two of the bolts which attach the guard fingers to the bar, and to this bracket I attach a spring which engages a projection from the knives or cutters. The arrangement is such that as the sickle-bar reciprocates the spring produces a tension that insures a steady movement and prevents shocks and undesirable vibrations.

In the accompanying drawings: Figure 1 is a plan view of part of the cutting mechanism of a mowing machine with my improvements applied. Fig. 2 shows a transverse section on the line 2—2 of Fig. 1. Fig. 3 is a view illustrating the different parts of my invention. Fig. 4 is a perspective view of one of the guard fingers.

The cutting apparatus shown is of well-known construction. My invention may be applied to cutters of various kinds.

The finger-bar A carries guard fingers B which are secured thereto by bolts C in the usual way. The knives or cutters E are supported and connected in any suitable way. The knives are connected with the pitman F by a head G. All of these parts are of well-known construction.

H indicates a bracket which is substantially V-shaped. Its opposite ends are formed with eyes *h* which receive two of the bolts C which attach the guard fingers to the finger-bar. At its opposite end the bracket carries a bolt I, carrying a sleeve I', on which are arranged the convolutions of a spring J, and which is threaded to receive a nut K to hold the spring in place. The spring has projecting from its lower coil an arm *j'* which engages between the arms of the bracket H and prevents the lower coil of the spring from turning when the knives are reciprocated. The opposite end of the spring is formed with a loop or hook *j* which engages a projection from the sickle-bar. Preferably I employ a bar L which is bolted or riveted to the sickle-bar and has a raised portion *l* which overlaps the inner end of the cutter-head G. The bar L carries a pin *l'* and this in turn carries a sleeve M with which the hooked end of the spring J engages.

As the cutters are reciprocated the spring J is put under tension and the movement of the cutters is effected against the force of the spring. In this way the cutters are given a steady movement and shocks and vibrations which might be otherwise caused are avoided. The cutters are reciprocated in the usual way. In Fig. 1 they are shown in an intermediate position with the spring only slightly under tension, but whenever the cutters are moved in either direction the spring is placed under tension and exerts a force on the cutters which tends to restrain the reciprocation slightly and this prevents the cutters from vibrating.

It will be observed that no modification of the cutting mechanism is required in order to apply my improvements. Two of the usual bolts C employed for attaching the guard fingers to the finger-bar are employed for attaching the bracket H to said bar, and the bar L carrying the pin *l'* can very easily be attached to the sickle-bar without modification thereof.

I claim as my invention:—

1. The combination of the finger-bar, the guard fingers bolted thereto, the cutters, a V-shaped bracket secured to the finger-bar by two of the bolts which attach the guard fingers thereto, a pin projecting upwardly from the cutters and a spring having a coiled portion with a vertical axis and the lower end of which is held against turning on the outer end of the bracket and which has also a hooked portion at its front end engaging the pin on the cutters.

2. The combination with the finger-bar, of the guard fingers bolted thereto, a V-shaped bracket secured to the finger-bar by two of the bolts which attach the guard fingers thereto, the cutters, a pin projecting upwardly from the cutters, a pin projecting upwardly from the rear end of the V-shaped bracket, and a spring coiled around said vertical pin on the bracket having its inner end held against turning and having a hooked portion engaging the pin on the cutters.

3. The combination of the finger-bar, the guard fingers bolted thereto, the cutters, the cutter head attached thereto, a V-shaped bracket secured to the finger bar by two of the bolts which attach the guard fingers thereto, a bar (L) secured to the cutters and having a raised portion which overlaps the inner end of the cutter head, a pin projecting upwardly from the bar L, a sleeve carried thereby and a spring having a coiled portion with a vertical axis attached to the bracket and the lower coil of which is held from turning when the cutters are reciprocated and which spring has also a hooked portion engaging the sleeve carried by the bar L.

In testimony whereof, I have hereunto subscribed my name.

CHARLES H. KUGLER.

Witnesses:
WILLIAM ROBERTSON,
JOHN BLAKE.

Copies of this patent may be obtained for five cents each, by addressing the "Commissioner of Patents, Washington, D. C."